US007421312B2

(12) United States Patent
Trossell

(10) Patent No.: US 7,421,312 B2
(45) Date of Patent: Sep. 2, 2008

(54) LIBRARY PARTITIONING MODULE OPERABLE TO MODIFY A REQUEST TO MOVE THE MEDIUM

(75) Inventor: David Trossell, Lymington (GB)

(73) Assignee: Bridgeworks Limited (GB)

( * ) Notice: Subject to any disclaimer, the term of this patent is extended or adjusted under 35 U.S.C. 154(b) by 203 days.

(21) Appl. No.: 10/851,692

(22) Filed: May 20, 2004

(65) Prior Publication Data

US 2005/0013149 A1      Jan. 20, 2005

(30) Foreign Application Priority Data

May 23, 2003    (GB)    ................................. 0311956.7

(51) Int. Cl.
*G06F 7/00* (2006.01)
(52) U.S. Cl. ...................... 700/214; 700/213
(58) Field of Classification Search ................ 700/214, 700/213; 710/8, 3, 12, 9; 711/115, 153
See application file for complete search history.

(56) References Cited

U.S. PATENT DOCUMENTS

| 6,240,467 | B1 * | 5/2001 | Beardsley et al. ............... 710/5 |
| 6,328,766 | B1 | 12/2001 | Long |
| 6,480,905 | B1 * | 11/2002 | Jesionowski et al. ........... 710/8 |
| 6,519,678 | B1 * | 2/2003 | Basham et al. ............... 711/112 |
| 6,636,778 | B2 | 10/2003 | Basham et al. ............... 700/214 |
| 6,675,260 | B2 * | 1/2004 | Torrey et al. ................ 711/114 |
| 6,950,723 | B2 * | 9/2005 | Gallo et al. .................. 700/214 |
| 7,062,614 | B2 * | 6/2006 | Camble et al. ............... 711/152 |

FOREIGN PATENT DOCUMENTS

| EP | 0859308 A1 | 8/1998 |
| WO | WO 2001-22210 A1 | 3/2001 |

OTHER PUBLICATIONS

Lamers, Lawrence J., Information technology—Small Computer System Interface—2, X3T9.2 Project 375D, Revision 10L, Sep. 7, 1993, Maxtor Corporation, Printed April 19, 1996 10:11am.

* cited by examiner

*Primary Examiner*—Gene O. Crawford
*Assistant Examiner*—Ramya G Prakasam
(74) *Attorney, Agent, or Firm*—Lowrie, Lando & Anastasi, LLP

(57) ABSTRACT

A library partitioning module (LPM) is configured to connect multiple hosts to a tape library. The LPM comprises at least two host input/outputs, each for connection to a respective host; and a library input/output for connection to the library. The LPM is an interface between hosts and a tape library such that it allow several hosts to access the library as if they have sole use of the library's resources. The modification of requests includes intercepting SCSI messages between robot and host and translating/transforming them. At least one tape slot for each host is allocated as a virtual import/export location. When a host sends a command to move a tape between a driver or a tape slot and an import/export location, the request is modified by the LPM so that movement occurs instead between a virtual import/export slot allocated to that host. This avoids conflicts involving the import/export location resources of the library. A handler forming part of the LPM arranges for tapes to be moved between the virtual import/export locations and the actual import/export locations. A library including partitioning and request modifying software is also disclosed.

16 Claims, 2 Drawing Sheets

LIBRARY PARTITIONING MODULE OPERABLE TO MODIFY A REQUEST TO MOVE THE MEDIUM

FIELD OF THE INVENTION

This invention relates to a library partitioning module, to a library system including a library partitioning module, to a library, to a method of operating a library partitioning module and to a method of operating a library. The invention relates in particular to the use of virtual import/export elements.

BACKGROUND OF THE INVENTION

A tape library, such as the ADIC Scalar 100 library, consists of a housing in which is included a robot and a number of resources, defined by their element address and their function, namely a number of tape drives (or data transfer elements), plural normal tape slots (or storage elements) and at least one import/export slot (or import/export element). Tape slots typically are tape receptacles in the walls of the housing, and import/export elements typically are receptacles in a door of the housing, which allow tape cassettes to be introduced into and taken from the library by a human operator. Each tape drive typically has a small computer system interface (SCSI) connection to a single host computer. The host also sends SCSI commands to control the robot to move tapes between the tape slots, tape drives and import/export slots. Tape libraries, or more particularly the robot thereof, are able, typically in response to a request from the host, to determine what tapes it contains in which slots, and to convey this information to the host along with information concerning the number of tape drives, normal slots and import/export slots that it has.

Libraries may instead include other types of data transfer elements such as optical mass storage media drive, and corresponding optical medium slots or elements and import/export slots or elements. Libraries may also include connections other than SCSI connections. In a library, a location intended for the retention of storage media, such as tapes or optical storage media, may be referred to as a storage element, and a location intended for the import and export of storage media may be referred to as an import/export element.

Conventionally, only one host has been able to use a library. However, it is known to divide the resources of a library between two or more hosts using a library partitioning module. Such modules are described in GB-A-2378283 and U.S. Pat. No. 6,044,442. Library partitioning modules can encounter problems as regards their import/export elements. In particular, conflicts can occur if two or more hosts want to export a media element (e.g. a tape cassette) simultaneously, or if one host wants to export a media element and another is expecting a media element import. A satisfactory solution to the problem of such conflicts that does not require stringent operator procedures and controls has not so far been proposed.

It is an aim of the invention to provide a library partitioning module with protection against import/export element resource conflicts.

SUMMARY OF THE INVENTION

According to a first aspect of this invention, there is provided a library partitioning module, for connecting plural hosts to a library, the module comprising:

at least first and second host input/outputs, each being suitable for connection to a respective host;

a library input/output, being suitable for connection to a library;

an allocator, being arranged to allocate at least a first storage element as a virtual import/export element to the first host, and to allocate at least a second storage element as a virtual import/export element to the second host; and a modifier arranged to receive at one of said first and second host input/outputs a request, the request being to move a medium between an element and an import/export element, the modifier being arranged to modify the request such that it constitutes a request to move the medium from one of a) said element, and b) another element to said first or second virtual import/export element, dependent on whether the request is received at the first or the second host input/output respectively, the modifier being further arranged to provide the modified request at the library input/output.

Certain aspects of the invention can avoid medium import/export location conflicts, albeit at the expense of a reduction in the number of storage element resources that remain available for use as storage elements. This can provide improved operational reliability, resulting in an improved product. Since the provision of fewer, larger libraries in place of more, smaller libraries can result in significant cost savings, this is seen to be an important step.

The modifier preferably is arranged to modify an element address forming part of the request and relating to a import/export element to an element address relating to a virtual import/export element, for inclusion in the modified request.

The library partitioning module preferably includes an import/export element handler, for providing at the library import/export requests for moving media between the virtual import/export elements and one or more import/export elements.

According to a second aspect of this invention, there is provided a library system comprising a library partitioning module as described above, a library connected to the library input/output, the library including a robot, and plural hosts connected to respective host input/outputs.

The third aspect of the invention provides a library comprising:

at least one data transfer element;

a plurality of storage elements;

at least one physical import/export element;

one or more host input/outputs, each being suitable for connection to a respective host;

an allocator for allocating at least one storage element to each host as a virtual import/export element; and a modifier connected to receive requests at a host input/output to move a medium between one of the elements and an import/export element, and to modify each request to constitute a request to move the medium between the one of the elements or another element and an appropriate virtual import/export element.

The third aspect of the invention provides a library which may have any number of host input/outputs and which can benefit from the absence or alleviation of constraints normally imposed by the number of physical import/export elements present in the library.

According to a fourth aspect of this invention, there is provided a method of operating a library partitioning module, the library partitioning module comprising a medium, an element, an import/export element, a storage element allocated as a virtual import/export element; and a library input/output, the method comprising:

receiving a request to move a medium between the element and the import/export element;

modifying the request to constitute a request to move the medium between one of a) the element and b) another element and the storage element; and providing the modified request at the library input/output.

Here, the modifying step preferably comprises modifying an element address forming part of the request and relating to an import/export element to an element address relating to the virtual import/export element.

The method further preferably comprises providing a request at the library input/output to move a medium between a virtual import/export element and a physical import/export location.

According to a fifth aspect of the invention, there is provided a method of operating a library comprising at least one data transfer element; a plurality of storage elements; at least one physical import/export element; and one or more host input/outputs, each for connection to a respective host, the method comprising:

allocating at least one storage element to each host as a virtual import/export element; and modifying a received request to move a medium between one of the elements and an import/export element to constitute a request to move the medium between the one of the elements or another element and an appropriate virtual import/export element.

The invention also provides a computer readable medium having stored thereon machine instructions for controlling computer apparatus to perform the method.

Embodiments of the invention will now be described, by way of example only, with reference to the accompany drawings.

DETAILED DESCRIPTION OF THE PREFERRED EMBODIMENTS

Figure 1:
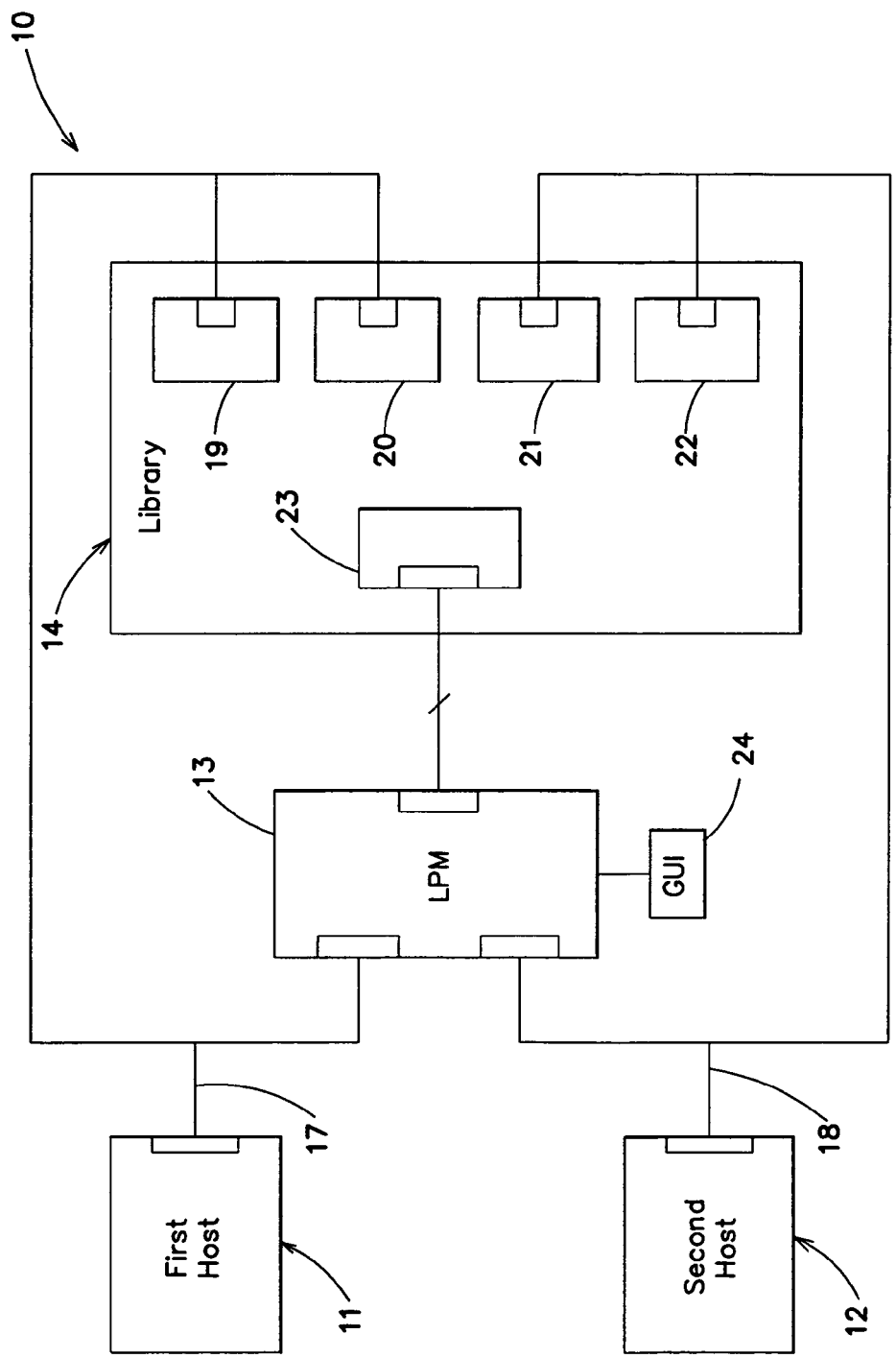
FIG. 1 is a schematic diagram of a library partitioning module in accordance with the invention connected to a library and to plural hosts.

Referring to FIG. 1, a library system 10 is shown comprising generally a first host 11 a second host 12, a library partitioning module (LPM) 13 and a library 14. Each host 11, 12 has a 16 bit wide SCSI input/output which is connected via a respective SCSI connection 17, 18 to a respective host input/output of the LPM 13. The SCSI connector 17 of the first host 11 is also connected to the SCSI input/outputs of first and second tape drives 19, 20, which form part of the library 14. Third and fourth tape drives 21, 22 (also forming part of the library 14) are connected to SCSI connector 18 of the second host 12. The LPM 13 has a 16-bit SCSI connection to a robot 23, which forms part of the library 14. The LPM 13 is also connected via a further communication connection, such as an RS232 or Ethernet connection, to a graphical user interface (GUI) 24, which preferably is a windows-driven computer. The library 14, including the components within it, and the first and second hosts 11, 12 are entirely conventional devices.

The LPM 13 serves to divide the resources of the library 14 between the hosts 11 and 12. In this connection, 'resources' means normal tape storage slots, tape drives and import/export slots, or elements, which are not shown in FIG. 1. The tape drives 19-21 are also divided between the first and second hosts 11, 12; this is effected in part by the physical connection of the tape drives to the hosts, but the LPM 13 also has information concerning which tape drives are assigned to which host. This division can be considered to be a virtual division or partition since there is no physical separation of the resources. The division may be based on instructions received, for example, from a host or through the GUI 24, or may be determined by the LPM 13, with or without reference to preset parameters or restrictions.

Figures 2, 3:
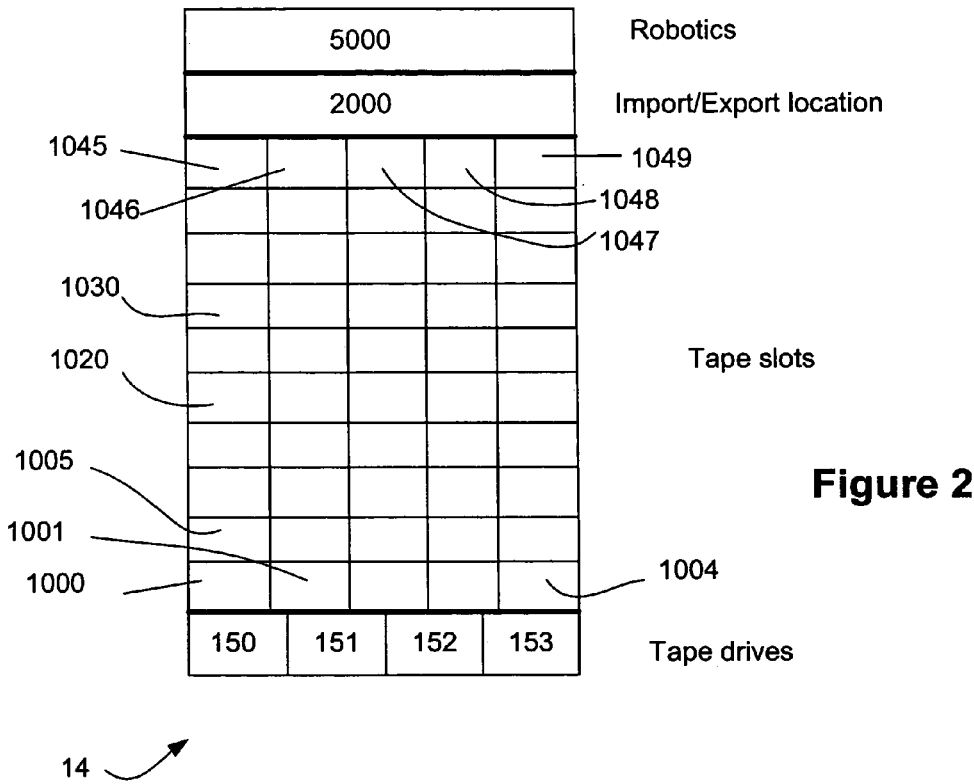
FIG. 2 illustrates the resources of the library included in FIG. 1 with their element addresses.
FIG. 3 illustrates the mapping of assumed element addresses to actual element addresses effected by the library partitioning module of FIG. 1.

The resources of the library 14 are illustrated in FIG. 2. Here, each element has associated with it an element address, which is used by the LPM 13 to identify the particular elements that it is concerned with when sending requests to the library 14. The element addresses are also used by the library 14 to identify the elements in commands sent to the LPM 13. The element addresses are also used here as reference numerals. The library includes four tape drives at addresses 150-153, fifty tape slots 1000-1049 (only some of which are labelled), one import/export slot 2000 and one robot 5000.

The LPM 13 intercepts SCSI commands from the hosts 11, 12, and intercepts SCSI reply data from the library 14 (more particularly, a robotics controller (not shown) associated with the robot 23). Most of these commands and most of the reply data are passed through to the relevant input/output without modification. There are, however, a number of exceptions to this.

When a host, for example the second host 12, sends a SCSI command known as 'mode sense', it expects the library 14 to reply with information detailing the number and start address (in absolute terms) of the robots, storage slots, import/export slots and tape drives that the library has configured within it. In fact, the mode sense command is intercepted by the LPM 13, which then modifies the command and forwards the modified command onto the robot 23. The robot 23 responds with an SCSI response passing back data which indicates the number and absolute starting address of its robots, tape storage elements, import/export slots and tape drives, and this response is intercepted by the LPM 13. The LPM 13 modifies the SCSI response to represent the elements of the library 14 that are allocated to the second host 12. This modified response is an SCSI response which shows a reduced number of tape drives, and storage slots, compared to that of the response provided by the robot 23, although the absolute start addresses remain unchanged. In this way, it is possible to allow the host to believe that the start addresses of the elements allocated to it (which the host believes to be the entire resources of the library) are different to the actual addresses, because address translation is performed by the LPM 13. The modified response shows a number of resources which is dependent on the division of the resources mentioned above.

In addition, the LPM 13 allocates for each host 11, 12 one or more tape storage slots as virtual import/export slots or elements. Since the library 14 has only one import/export slot location, only one virtual import/export slot is allocated to each host 11,12 in this example. However, the number of virtual import/export storage slots can be varied according to customer requirements. The number of available tape storage slots for use as tape storage slots is therefore reduced by the number of virtual import/export locations. The available tape storage slots are divided between the hosts 11, 12 by the LPM 13 in an appropriate manner. The result is that the LPM 13 references the resources of the library 14 in a different way to that of the hosts 11, 12. This is illustrated in FIG. 3.

Referring to FIG. 3, the resources allocated to the hosts 11, 12 are shown with the element addresses that the hosts assume are the actual element addresses of those resources. The hosts 11,12 make this assumption because they are informed by the LPM 13 of the number of and the starting element address of the different resource types allocated to them. It can be seen that each host 11, 12 has twenty-four media supports (storage elements) and two tape drives. As can be seen from the actual element addresses, though, the first host 11 is allocated the storage slots 1000-1023, but the second host 12 is allocated tape slots 1024-1047. Similarly, although each host thinks that they have tape drives 150 and 151, the second host 12 instead has tape drives 152, 153 allocated to it. The translation of element addresses is performed by the LPM 13, in respect of messages sent in both directions between the hosts and the library 14. The first host 11 can be seen to have been allocated normal tape slot 1048 as a virtual import/export location. The second host 12 similarly has been allocated normal tape slot 1049 as a virtual import/export slot. The actual physical import/export location 2000 has not been allocated to either of the hosts 11, 12.

When a host, for example the second host 12, wants a tape moved between a tape drive and a slot, it issues a SCSI command, which is then intercepted by the LPM 13. The LPM 13 modifies the command to change the slot and/or tape address used by the second host 12 to the corresponding slot and/or tape address stored in a memory (not shown) of the LPM and given in FIG. 3. For example, if the second host 12 requests movement of a tape from tape drive number 151 to normal slot number 1012, the LPM 13 modifies the tape address to number 153 and the normal slot address to number 1035, since these are the corresponding addresses (the second host's tape drives start at 152 and its normal slots start at 1024). The modified command is then fed from the LPM 13 to the robot 23, which moves the tape in the manner requested. It will be seen that this results in only the resources of the library 14 which are allocated to the second host 12 being affected, whereas it would have been a tape allocated to the first host 11 which would have been moved (and then to the wrong drive) if the LPM 13 had not modified the addresses in the SCSI command.

When a host 11,12 wants a tape moved between a storage slot or a tape drive and the import/export location 2000, it issues an appropriate SCSI command, which is then intercepted by the LPM 13. The LPM 13 modifies the command to change the tape slot or tape drive element address to the actual element address given by FIG. 3, if this is different. The LPM 13 also modifies the command to change the import/export slot address 2000 to the element address given by FIG. 3, which relates to a storage slot, address 1048 for the first host 11 or address 1049 for the second host 12. The result is that instead of moving a tape to or from the import/export location 2000, it is instead moved to or from the appropriate virtual import/export slot 1048, 1049. Consequently, there is no opportunity for conflicts involving the import/export location 2000.

On completion of a tape movement task, the robot 23 signals this completion to the LPM 13. If, in the meantime, the LPM 13 receives a request from the other host 11,12 to move a tape, the LPM modifies the request as necessary, and places the modified request into a queue. Only when the LPM 13 receives confirmation that the robot 23 has completed its original task does the LPM feed the later modified request to the robot. This feature allows all tape movement requests to be effected by the robot 23 without the hosts 11,12 having to communicate in any way. If other requests, such as mode sense requests, are made while the robot 23 is busy, these requests are also queued until the robot 23 becomes free. If plural requests build in the queue, these are dealt with in a first-in, first-out fashion.

The LPM 13 also includes an import/export location handler, which is effected in software and thus is not illustrated in the Figures. The import/export location handler is able to scan the virtual import/export locations 1048, 1049 as well as the physical import/export location 2000 and to determine their contents. This is effected by the sending of appropriate commands to the library 14. The import/export location handler is operable to move tapes between the virtual import/export locations 1048, 1049 and the physical import/export location 2000 according to received instructions or alternatively in response to predetermined conditions being met. For example, the LPM 13 might be programmed to effect tape movement in response to an external trigger, such as the receipt of a particular command from a host 11,12 or the receipt of particular information through a web-based interface (not shown). Control may instead be affected through manually entered commands received through the web-based interface or through the GUI 24 or through another serial interface.

The modification of requests and the import/export handler are effected by software stored in and run by a processor (not shown) forming part of the LPM 13.

In another embodiment, not shown, computer readable instructions for effecting the control of a LPM are represented as a signal, or stored on a storage medium. This can allow an existing LPM to be reprogrammed with the instructions to arrive at an LPM operating as described above.

In a further embodiment (not shown), the LPM 13 is integrated into a library, i.e. there is no physical separation of the library from the LPM. Here, the library comprises at least two host input/outputs, each for connection to a respective host. The library includes means for allocating at least one storage element to each host as a virtual import/export element; and a modifier arranged and connected to receive requests to move a medium between a storage element and an import/export element received at a host input/output, and to modify each request to constitute requests to move the medium between a storage element and the appropriate virtual import/export element. Here, the software used to carry out the partitioning of the library and the allocation of virtual import/export slots is likely to form part of the software implementing the library robotics, but could instead be run in another part of the library. the modifier is arranged to modify an element address forming part of the request and relating to a medium import/export element to an element address relating to a virtual import/export element, for inclusion in the modified request. The library preferably includes means for determining its storage element resources, and for dividing the resources less the resources allocated to the virtual import/export elements between hosts. The library also includes an import/export element handler for moving media between the virtual import/export elements and one or more import/export elements.

It will be appreciated that the invention has broader application than the specific example described above. For example, any number of hosts may be connected to the library 14 and the LPM 13. If the invention is embodied in a library, the library itself may include any number of host input/outputs. Also, the library may include any number of each of the different resource elements, whether the invention is implemented as an LPM or as a library.

Most particularly, it will be appreciated that, although the invention is particularly useful where the number of hosts exceed the number of physical import/export locations, it can also be used in other situations. For example, a known LPM applied to a library having three hosts and four import/export locations could allocate only one or two locations per host since each host needs to be allocated at least one location to ensure conflict avoidance. However, using the LPM of the invention, each host could be allocated one, two, three or four virtual import/export locations. The number allocated to one host would not usually affect the number of virtual import/export locations allocatable to the other hosts. The maximum number of virtual import/export location for a given host will not normally exceed the number of physical import/export locations, but this is not essential.

In a still further embodiment (not shown in the drawings), a library includes only one host input/output. A robotics controller forming part of the library is arranged to allocate to a host connected to the host input/output a number of virtual import/export elements which is greater than the number of physical import/export elements present in the library. This allocation may be performed on initialisation or start-up of the library. A 'mode sense' request from a host connected to the host input/output is responded to by indicating that the number of import/export elements is equal to the number of virtual import/export elements which has been allocated to the host by the robotics controller. With this library, it is possible to implement the exportation of a number of media which is greater than the number of physical import/export elements, thereby allowing other processes to take place in the library, without requiring the media to be physically exported. The media can subsequently be physically exported using an import/export element handler running separately to the processes which do not involve the physical import/export elements. This does not suffer the disadvantage which can be found in prior art libraries of processes being delayed whilst the library waits for plural media to be exported from the library, such exports usually requiring repeated manual removal of media from the import/export elements. The advantages are particularly profound when the number of physical import/export elements is small, for example one or two. The same principle also can be applied to a library having two or more host input/outputs, with the same resulting advantages.

What is claimed is:

1. A library partitioning module comprising:
    at least first and second bidirectional host input/outputs, each for connection to a respective associated one of at least first and second hosts;
    a bidirectional library input/output, for connection to a library, said library having at least one physical import/export element and having storage element resources including a first storage element and a second storage element;
    an allocator, the allocator being arranged to allocate at least said first storage element as a first virtual import/export element to the first host, and to allocate at least said second storage element as a second virtual import/export element to the second host; and
    a modifier, the modifier being arranged to receive at one of said first and second bidirectional host input/outputs a SCSI command, the SCSI command including an element address relating to said at least one physical import/export element and being to move a storage medium between a first element and one of said at least one physical import/export element,
    the modifier being arranged, when the SCSI command is received at the first bidirectional host input/output, to modify said element address forming part of the SCSI command to an element address relating to the first virtual import/export element such that the SCSI command constitutes a SCSI command to move the storage medium from one of a) said first element, and b) a second element to said first virtual import/export element, and
    the modifier being arranged, when the SCSI command is received at the second bidirectional host input/output, to modify the said element address forming part of the SCSI command to an element address relating to the second virtual import/export element such that the SCSI command constitutes a SCSI command to move the storage medium from one of a) said first element, and b) a third element to said second virtual import/export element,
    the modifier being further arranged to provide the modified SCSI command at the bidirectional library input/output.

2. A library partitioning module as claimed in claim 1, in which the modifier is arranged to modify an element address, said element address forming part of the request and relating to a physical import/export element to an element address relating to one of said first and second virtual import/export elements, for inclusion in the modified request.

3. A library partitioning module as claimed in claim 1, including a determiner and divider arranged to determine the storage element resources of a library connected to the bidirectional library input/output, and to divide said resources less the resources allocated to the virtual import/export elements between said at least first and second hosts.

4. A library partitioning module as claimed in claim 1, including an import/export element handler, for providing at the bidirectional library input/output SCSI commands for moving storage media between the at least first and second virtual import/export elements and the at least one physical import/export elements.

5. A library system comprising a library partitioning module as claimed in claim 1, a library connected to the bidirectional library input/output, the library including a robot, and plural hosts connected to respective bidirectional host input/outputs.

6. A library comprising:
    at least one data transfer element;
    a plurality of storage elements;
    at least one physical import/export element;
    at least one bidirectional host input/output, each one of said at least one bidirectional host input/output being for connection to a respective associated one of at least one host;
    an allocator, the allocator being for allocating at least one of said plurality of storage elements to each of said at least one host as a virtual import/export element; and
    a modifier, the modifier being connected to receive a SCSI command at one of said at least one bidirectional host input/outputs, said SCSI command being to move a storage medium between one of said at least one physical import/export elements and a first element, said first element being one of a) said plurality of storage elements and b) said at least one data transfer element, and to modify said SCSI command to constitute a SCSI command to move the storage medium between one of said at least one virtual import/export elements allocated to said host associated with said one of said bidirectional host input/outputs at which said SCSI command was received and one of a) said first element and b) a second element.

7. A library as claimed in claim 6, including at least two bidirectional host input/outputs.

8. A library as claimed in claim 6, in which the library includes only one bidirectional host input/output.

9. A library as claimed in claim 6, in which the allocator is arranged to allocate to each host a number of virtual import/export elements which is greater than the number of physical import/export elements present in the library.

10. A method of operating a library partitioning module, the method comprising:
   providing the library partitioning module with a storage medium, a first element, a second element, a physical import/export element, a storage element allocated as a virtual import/export element, and a bidirectional library input/output;
   receiving a SCSI command to move the storage medium between the physical import/export element and the first element;
   modifying the SCSI command to constitute a SCSI command to move the medium between the storage element and one of a) the first element and b) the second element; and
   providing the modified SCSI command at the bidirectional library input/output.

11. A method as claimed in claim 10, in which the modifying step comprises modifying an element address forming part of the SCSI command and relating to the physical import/export element to an element address relating to the virtual import/export element.

12. A method as claimed in claim 10, further comprising providing a SCSI command at the bidirectional library input/output to move a storage medium between the virtual import/export element and the physical import/export element.

13. A method of operating a library, the method comprising:
   providing at least one data transfer element; a plurality of storage elements; at least one physical import/export element; and at least one bidirectional host input/output, each of said at least one bidirectional host input/output being for connection to a respective associated one of at least one host;
   allocating at least one of said plurality of storage elements to each of said at least one host as a virtual import/export element; and
   modifying a received SCSI command to move a storage medium between one of said at least one physical import/export element and a first element, said first element being one of a) said plurality of storage elements and b) said at least one data transfer element, to constitute a SCSI command to move the storage medium between one of said at least one virtual import/export element allocated to said host associated with said one of said at least one bidirectional host input/output at which said SCSI command was received and one of a) said first element and b) a second element.

14. A method as claimed in claim 13, in which the allocating step comprises allocating to each host a number of virtual import/export elements which is greater than the number of physical import/export elements present in the library.

15. A computer readable medium having stored thereon machine instructions for controlling a computer apparatus to perform a method according to claim 10.

16. A computer readable medium having stored thereon machine instructions for controlling a computer apparatus to perform a method according to claim 13.

* * * * *